US012672604B2

(12) United States Patent
Missotten et al.

(10) Patent No.: US 12,672,604 B2
(45) Date of Patent: Jul. 7, 2026

(54) CUT CROP MONITORING

(71) Applicant: CNH Industrial Belgium N.V., Zedelgem (BE)

(72) Inventors: Bart M.A. Missotten, Herent (BE); Martin J. Roberge, Quebec (CA)

(73) Assignee: CNH Industrial Belgium N.V. (BE)

( * ) Notice: Subject to any disclaimer, the term of this patent is extended or adjusted under 35 U.S.C. 154(b) by 389 days.

(21) Appl. No.: 18/368,103

(22) Filed: Sep. 14, 2023

(65) Prior Publication Data

US 2024/0090376 A1 Mar. 21, 2024

(30) Foreign Application Priority Data

Sep. 15, 2022 (EP) ..................................... 22195957

(51) Int. Cl.
*A01D 41/127* (2006.01)

(52) U.S. Cl.
CPC .................................. *A01D 41/127* (2013.01)

(58) Field of Classification Search
CPC .............. A01D 41/127; A01D 41/1277; A01D 43/085; A01D 46/085
See application file for complete search history.

(56) References Cited

U.S. PATENT DOCUMENTS

| | | | | |
|---|---|---|---|---|
| 12,250,905 | B2 * | 3/2025 | Anderson | A01D 41/1272 |
| 2014/0067745 | A1 * | 3/2014 | Avey | G06Q 10/04 706/46 |
| 2021/0082021 | A1 | 3/2021 | Sharma et al. | |
| 2024/0090376 | A1 * | 3/2024 | Missotten | A01D 41/127 |

FOREIGN PATENT DOCUMENTS

| | | | | |
|---|---|---|---|---|
| CN | 102944584 A | | 2/2013 | |
| CN | 103837426 A | | 6/2014 | |
| CN | 204634427 U | | 9/2015 | |
| CN | 108088962 A | | 5/2018 | |
| CN | 108627619 A | | 10/2018 | |
| CN | 113570568 A | | 10/2021 | |
| CN | 117705889 A | * | 3/2024 | G01N 27/12 |
| DE | 102009026346 A1 | | 2/2011 | |
| DE | 102017210852 A1 | | 1/2019 | |

(Continued)

OTHER PUBLICATIONS

Aksenov et al., "Volatile Organic Compounds (VOCs) for Noninvasive Plant Diagnostics", Chemistry, Process Design, and Safety for the Nitration Industry/ACS/Symposium Series, American Chemical Society/Oxford University Press, US, Sep. 25, 2013, vol. 1141, 23 pages.

(Continued)

*Primary Examiner* — Monica L Perry

(74) *Attorney, Agent, or Firm* — Buchanan Ingersoll & Rooney PC

(57) ABSTRACT

A method of monitoring a cut-crop laying in a field or during a cutting process, the method includes: receiving a sensing signal from a cut-crop sensor positioned on a mobile agricultural machine, wherein the sensing signal is representative of a sensed gaseous composition associated with the cut-crop; estimating a condition of the cut-crop based on the sensing signal; and outputting cut-crop state data including the condition of the cut-crop.

14 Claims, 2 Drawing Sheets

(56) References Cited

FOREIGN PATENT DOCUMENTS

| | | | | |
|---|---|---|---|---|
| EP | 3400782 | A1 | 11/2018 | |
| EP | 4338576 | A1 * | 3/2024 | ............. G01N 27/12 |
| IN | 114018912 | A | 2/2022 | |
| JP | 2021087369 | A | 6/2021 | |
| WO | WO-2019001885 | A1 * | 1/2019 | ........... A01D 41/127 |

OTHER PUBLICATIONS

European Search Report for European Application No. 22195957.0, dated Feb. 27, 2023, 12 pages.

Pobkrut et al., "Sensor Drone for Aerial Odor Mapping for Agriculture and Security Services", IEEE Conference Paper, Jun. 2016, 6 pages.

Wilson, A., "Diverse Applications of Electronic-Nose Technologies in Agriculture and Forestry", Sensors, 2013, 13, pp. 2295-2348.

Bonadies et al., "A survey of unmanned ground vehicles with applications to agricultural and environmental sensing", Autonomous Air and Ground Sensing Systems for Agricultural Optimization and Phenotyping; Proc. of SPIE vol. 9866, 98660Q, May 17, 2016, 14 pages.

* cited by examiner

CUT CROP MONITORING

CROSS REFERENCE TO RELATED APPLICATION

This application claims priority to European Application No. 22195957.0, filed Sep. 15, 2022, the content of such application being incorporated by reference herein in its entirety.

FIELD OF THE INVENTION

The present disclosure relates to monitoring a cut-crop laying in a field or during a cutting process and a cut-crop monitoring system.

BACKGROUND OF THE INVENTION

Many agricultural processes involve cutting a crop and leaving at least a portion of the cut-crop in the field for a period of time. For example, the hay making process typically involves cutting a grass or other herbaceous crop and leaving it laying in the field to dry out. Depending upon the dryness, the cut-crop can be collected as silage, haylage or hay by baling. Controlling the drying process and managing mould formation is an important aspect of the hay making process. Monitoring, controlling and managing the condition of the cut-crop is important in other agricultural processes involving cut-crop laying in a field. Such processes may be directed to cut-crop including: flax crop; by-products of grain harvesting such as chaff, straw, and residue; and by-products of root-crop harvesting such as haulm topping from potato crops or shredded/mulched leaves from beets.

The present disclosure provides a system and method for monitoring a cut-crop in a field to improve the associated agricultural process.

SUMMARY OF THE INVENTION

According to a first aspect of the present disclosure there is provided a method of monitoring a cut-crop laying in a field or during a cutting process, the method comprising:

- receiving a sensing signal from a cut-crop sensor positioned on a mobile agricultural machine, wherein the sensing signal is representative of a sensed gaseous composition associated with the cut-crop;
- estimating a condition of the cut-crop based on the sensing signal; and
- outputting cut-crop state data comprising the condition of the cut-crop.

The method may further comprise receiving position data from a position sensor positioned on the mobile agricultural machine, and outputting the cut-crop state data as an array of condition values each associated with a position of the mobile agricultural machine.

The method may comprise outputting the cut-crop state data as mapping data representative of the cut-crop condition across an area of the field.

The method may comprise:

- determining one or more process parameters related to one or more processing operations on the cut-crop based on the condition of the cut-crop, wherein the one or more process parameters correspond to any of: a timing parameter, position parameter, a selection parameter, and/or an intensity parameter of the processing operation; and

- outputting the process parameters as part of the cut-crop state data.

The method may comprise:

- selecting one or more future processing operations based on the condition of the cut-crop; and
- outputting the one or more selected future processing operations as part of the cut-crop state data.

The method may comprise selectively processing the field based on the cut-crop state data.

The method may comprise processing selected locations of the field based on the cut-crop state data.

Processing the field may comprises one or more of:

- re-arranging the cut-crop;
- conditioning the cut-crop;
- spraying the cut-crop;
- collecting the cut-crop; and
- tilling the cut-crop into the field.

Estimating the condition of the cut-crop may comprise estimating the condition of the cut-crop by comparing the sensing signal to a reference odour library.

Estimating a condition of the cut-crop may comprise:

- comparing the sensing signal against a reference signal, representative of a previous state of the cut-crop, to determine a relative change in condition of the cut-crop and/or a rate of change in condition of the cut-crop; and
- outputting the change and/or the rate of change in condition of the cut-crop as part of the cut-crop state data.

Estimating a condition of the cut-crop may comprise:

- comparing the sensing signal against a reference sensing signal, representative of a previous gaseous composition associated with the cut-crop; and
- estimate the condition of the cut-crop based on a relative change in the sensed gaseous composition.

The condition of the cut-crop may be representative of one or more of:

- a dryness state of the cut-crop;
- a fermenting state of the cut-crop;
- a rotting state of the cut-crop; and
- a decomposition state of the cut-crop.

The reference odour library may comprise one or more reference signals corresponding to one or more of:

- a dryness state of the cut-crop;
- a fermenting state of the cut-crop;
- a rotting state of the cut-crop; and
- a decomposition state of the cut-crop, for one or more cut-crop types.

The cut-crop may comprise any of: hay, grass, flax, grains, chaff, straw, residue, leaves, stems, stalks, seedpods, husks, tops, shredded crop, mulched crop, or haulm.

Outputting the cut-crop state data may comprise outputting the cut-crop state data to one or more of:

- a remote monitoring module;
- a cab display unit of an agricultural vehicle; or
- a control system of the mobile agricultural machine, the control system for controlling one or more operating parameters of the mobile agricultural machine.

According to a second aspect of the present disclosure there is provided a cut-crop monitoring system comprising:

- a mobile agricultural machine comprising a cut-crop sensor capable of sensing a gaseous composition associated with a cut-crop laying in a field or during a cutting process; and
- a controller configured to:
  - receive a sensing signal from the cut-crop sensor, wherein the sensing signal is representative of the gaseous composition associated with the cut-crop;

estimate a condition of the cut-crop based on the sensing signal; and output cut-crop state data representative of the condition of the cut-crop.

The controller may be configured to:

estimate the condition of the cut-crop by comparing the sensing signal to a reference odour library.

The cut-crop sensor may comprise a sensor array including a plurality of sensor elements. The sensing signal may comprise an element response signal for each sensor element. The controller may be configured to compare a combination of the element response signals to one or more reference signal combinations of the reference odour library.

The cut-crop sensor may comprise an electronic nose.

The cut-crop sensor may be positioned within a threshold sensing height from a ground surface or a contact point of the mobile agricultural machine with a ground surface. The threshold sensing height may comprise 1 meter, preferably 0.5 metres, more preferably 0.3 metres. The cut-crop sensor may comprise an input duct for carrying the gaseous composition to an active area of the cut-crop sensor. The cut-crop sensor may comprise active air means for producing an air-flow from a distal end of the input duct to a proximal end of the input duct adjacent to the active area of the sensor. The threshold sensing height may be with reference to the distal end of the input duct.

The condition of the cut-crop may be representative of one or more of:

a dryness state of the cut-crop;

a fermenting state of the cut-crop;

a rotting state of the cut-crop; and a decomposition state of the cut-crop.

The reference odour library may comprise one or more reference signal combinations corresponding to one or more of:

a dryness state of the cut-crop;

a fermenting state of the cut-crop;

a rotting state of the cut-crop; and a decomposition state of the cut-crop, for one or more cut-crop types.

The cut-crop sensor may be configured to detect at least one volatile component of the gaseous composition associated with the cut-crop laying in a field.

The controller may be configured to:

compare the sensing signal against a reference signal, representative of a previous state of the cut-crop, to determine a change in condition of the cut-crop; and output the change in condition of the cut-crop as part of the cut-crop state data.

The mobile agricultural machine may comprise a position sensor capable of detecting a position of the mobile agricultural machine. The controller may be configured to:

receive position data from the position sensor, for example a GPS sensor; and output the cut-crop state data comprising an array of condition values each associated with a detected position of the mobile agricultural machine.

The controller may be configured to output cut-crop state data comprising mapping data representative of the cut-crop condition across an area of the field.

The controller may be configured to selectively enable the cut-crop sensor and/or selectively estimate the condition of the cut-crop based on the position data.

The controller may be configured to:

receive field data indicating one or more regions of interest of the field; and selectively enable the cut-crop sensor, selectively estimate the condition of the cut-crop, and/or selectively adjust a sampling rate of the cut-crop sensor based on the field data and the position data.

The field data may indicate: a field entrance; a field border; and/or a region susceptible to mould or moisture.

The mobile agricultural machine may be configured to selectively process the field based on the cut-crop state data.

The mobile agricultural machine may be configured to process selected locations of the field based on the cut-crop state data.

The mobile agricultural machine may be configured to selectively process the field by performing one or more of:

re-arranging the cut-crop;

conditioning the cut-crop;

spraying the cut-crop;

collecting the cut-crop; and tilling the cut-crop into the field.

The mobile agricultural machine may comprise one or more of: a rake; a mower; a macerator; a baler; a tillage implement; a tractor; a forage wagon; a drone; and a scout.

The mobile agricultural machine may comprise an agricultural vehicle and/or agricultural implement.

The mobile agricultural machine may comprise a manually, semi-autonomously or autonomously operated vehicle and/or implement.

The cut-crop may comprise any of: hay, grass, flax, grains, chaff, straw, residue, leaves, stems, stalks, seedpods, husks, tops, shredded crop, mulched crop, or haulm.

There may be provided a computer program, which when run on a computer, causes the computer to configure any apparatus, including a circuit, controller, or device disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium, which may be a physical computer readable medium such as a disc or a memory device, or may be embodied as a transient signal. Such a transient signal may be a network download, including an internet download. There may be provided one or more non-transitory computer-readable storage media storing computer-executable instructions that, when executed by a computing system, causes the computing system to perform any method disclosed herein.

BRIEF DESCRIPTION OF THE DRAWINGS

One or more embodiments will now be described by way of example only with reference to the accompanying drawings in which.

DETAILED DESCRIPTION OF THE PREFERRED EMBODIMENTS

The evolution of the crop during the hay making process from decision when to mow to decision when to invert, rake and eventually bale is very complex, weather sensitive and depends on the soil type and condition, including soil humidity and compaction, ambient conditions, including presence/absence of shadow, and presence/absence of pests, mould and/or fungi. Automation of this process requires gathering or sensing accurate data and properties relating to the crop to feed into a decision support system. In the hay and forage industry optical sensing can provide composition of the crops beside the moisture content. However, the change in condition of the crop can give rise to an associated change in other properties of the crop. For example, a smell of the crop can change during the drying out of the crop, from freshly cut grass to hay. In addition, fungal infected hay (mould) or a rotting process can produce a clearly recognizable (bad) smell.

The change in smell in the hay making process or other cut-crop processes results from the exposure of the cut-crop to ambient conditions. The ambient conditions (temperature, humidity, sun, wind, precipitation etc.) may vary while the cut-crop is laying in the field. Cut-crop processes may including drying (e.g., for hay), fermenting (e.g., for silage), rotting (e.g., for flax) and decomposing (e.g., for residue/leaves/haulm), and can have a corresponding change or evolution of smell arising from a quantity, type and/or relative proportion of volatile gaseous components being released by the process.

The present disclosure provides a system and method for detecting a gaseous composition associated with the cut-crop during a cutting process or while the cut-crop is laying in the field and outputting cut-crop state data comprising a condition of the cut-crop.

Figure 1:
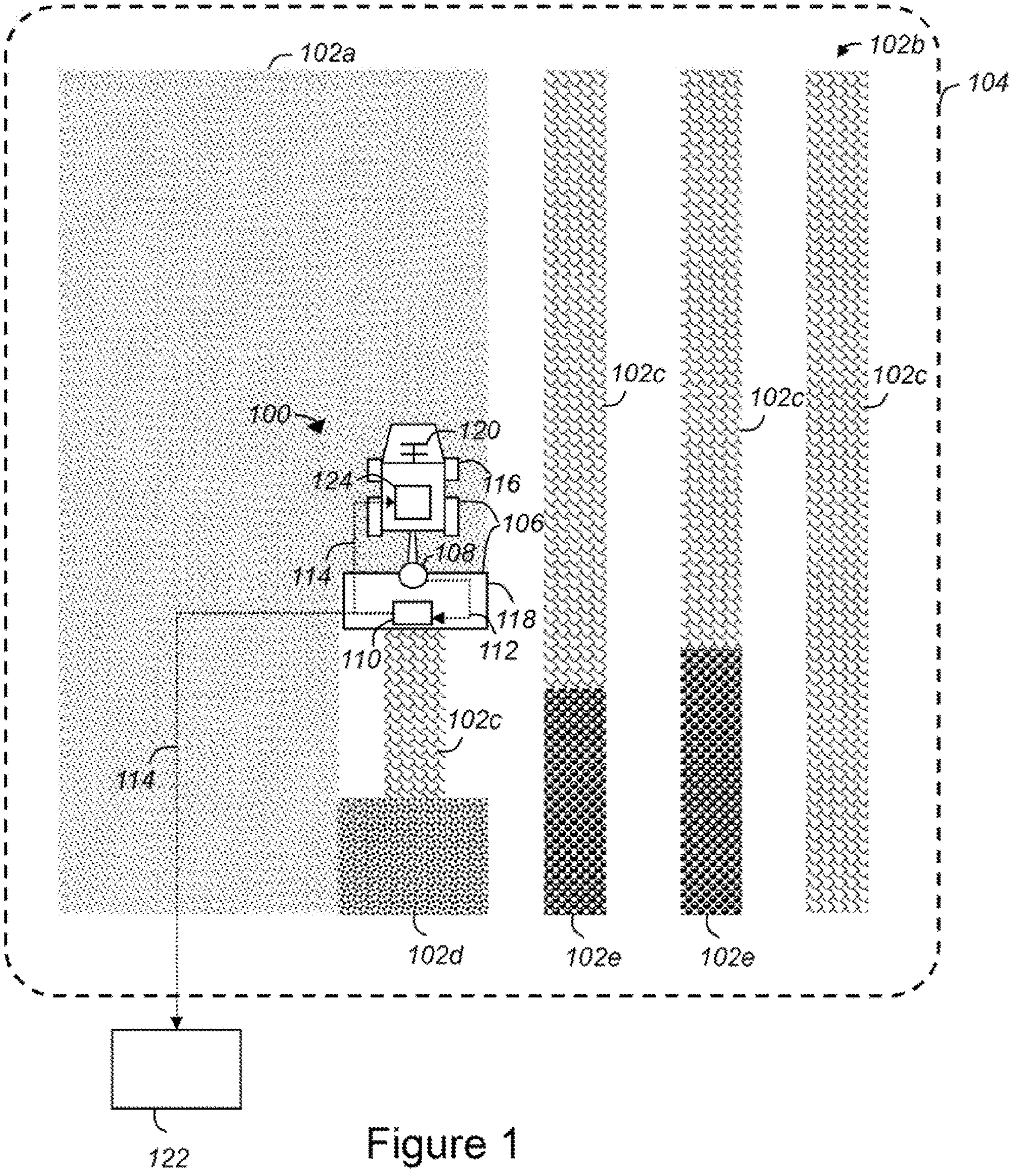
FIG. 1 illustrates a cut-crop monitoring system according to an embodiment of the present disclosure.

FIG. 1 illustrates a cut-crop monitoring system 100 (which may be referred to herein as simply the system 100) monitoring a cut-crop 102 laying in a field 104 according to an embodiment of the present disclosure. The system 100 comprises a mobile agricultural machine 106 (which may be referred to herein as the machine 106). The mobile agricultural machine 106 may comprise a cut-crop sensor 108 capable of sensing a gaseous composition associated with the cut-crop 102. The system 100 further comprises a controller 110. The controller 110 can receive a sensing signal 112 from the cut-crop sensor 108. The sensing signal can be representative of a gaseous composition associated with the cut-crop 102. The controller 110 can estimate a condition of the cut-crop 102 based on the sensing signal and output cut-crop state data 114 representative of the estimated condition of the cut-crop 102.

By accurately estimating and outputting a condition of the cut-crop 102, the system 100 can advantageously provide data for influencing and improving processing of the cut-crop 102 resulting in higher efficiency, quality and/or yield. For example, for the hay-making process, the system 100 and/or an operator may make, select, schedule and/or set an intensity of a processing operation, such as raking, tedding, spraying or baling, based on the condition of the cut-crop 102. Unnecessary process steps may be avoided or additional process steps may be implemented based on the cut-crop state data.

As described herein, a gaseous composition may comprise one or more gaseous components. The gaseous composition may comprise one or more volatile gaseous components.

The controller 110 may estimate the condition of the cut-crop 102 by comparing the sensing signal 112 to a reference odour library. For example the controller 110 may identify a type and/or relative quantity of one or more odours (gaseous compositions) associated with the cut-crop 102 by comparing the sensing signal 112 to the reference odour library. The controller 110 may then estimate the condition of the cut-crop 102 based on the type and/or quantity of the one or more odours.

The reference odour library may comprise a database of reference signals corresponding to sensing signals output by the cut-crop sensor in response to one or more reference gaseous compositions. The one or more reference gaseous compositions may comprise gaseous compositions that can be produced during processing of the cut-crop 102. For example, the one or more reference gaseous compositions may be associated with different dryness states of the cut-crop (e.g., for a hay-making process); different fermenting states of the cut-crop (e.g., for silage); a rotting state of the cut-crop (e.g., for flax); different decomposition states of the cut-crop (e.g., for residue); and different levels of mould formation on the cut-crop. The reference odour library may be crop specific (e.g. flax, alfalfa) or may comprise crop-specific sub-libraries. The reference odour library may be generated during a calibration process in which the cut-crop sensor 108, or a substantively identical reference cut-crop sensor, is exposed to a series of reference samples (e.g. samples of hay in various conditions or chemical extracts corresponding to the reference gaseous compositions associated with the hay in the various conditions). The resulting sensing signal can then be stored as a reference sensing signal associated with the reference gaseous composition. The controller 110 may generate the reference odour library as part of the calibration process. The controller 110 may store the reference library in a memory of the system 100 or in remote storage accessible via a network (such as the internet). The calibration process may be repeated every few years to ensure reliable operation of the sensor. The controller 110 may output a calibration warning signal indicating that a calibration is due in response to the elapse of a calibration period.

The cut-crop sensor 108 may comprise any sensor capable of detecting one or more gaseous components associated with the cut-crop 102. The cut-crop sensor 108 may comprise an odour sensor. The cut-crop sensor 108 may comprise one or more sub-sensors that can identify and quantify specific chemical species associated with the cut-crop processing, for example specific chemical species associated with freshly cut grass, like certain alcohols and aldehydes belonging to the so-called green leaf volatiles, or a specific species associated with hay mould.

In some examples, the cut-crop sensor 108 may comprise an electronic nose. Electronic noses can advantageously detect a wide range of gaseous compositions. For example, the cut-crop sensor 108 may comprise a sensor array including a plurality of sensor elements. The sensor elements may comprise any active element that undergoes a change in one or more chemical or physical properties in the presence of one or more gaseous components. Each sensor element may comprise a non-specific sensor element that can detect the presence of one or more volatile gaseous components but does not identify the specific chemical species. The one or more sensor elements may comprise any known sensor elements such as metal oxide semiconductors (MOS) sensor elements (including complementary MOS (CMOS) sensor elements), metal oxide semiconductor field effect transistors (MOSFET) sensor elements, surface acoustic wave sensor elements, conducting polymer sensor elements, fibre optic sensor elements, micro-electromechanical systems (MEMS) sensor elements, and quartz crystal microbalance sensor elements. The sensor elements may respond to the presence of one or more volatile gaseous components with a change in electrical properties, such as electrical conductivity. Different sensor elements of the sensor array may have different physical properties such that they have different response signatures to the presence of the gaseous components. For example, different MOS or MOSFET sensor elements may have a different physical size or different doping. Providing different sensor element responses can improve detection of specific gaseous components by the cut-crop sensor 108.

Each sensor element may output an element response signal. The combination of element response signals may form the sensing signal 112. The combination of element response signals can provide a distinct odour signature for a particular gaseous composition. For example, many odours will comprise a plurality or mixture of volatile gaseous components. Each sensor element may respond differently to the different volatile components of the mixture due to manufacturing tolerances, position on the sensor array and/or design differences (such as the different physical properties mentioned above). The plurality of different element response signals from each sensor element can provide a distinct electronic fingerprint for identifying each gaseous mixture. The reference odour library may include reference signal combinations corresponding to the combination of element response signals output by the plurality of sensor elements in the presence of corresponding reference gaseous compositions. During operation in the field 104, the controller 110 may compare the combination of element response signals to the reference signal combinations to identify a type and/or quantity of one or more gaseous composition associated with the cut-crop 102 and estimate the condition of the cut-crop 102 based on the type and/or quantity.

The controller 110 may implement pattern recognition and/or multivariate analysis techniques to generate the reference odour library and/or identify the type and relative quantity of one or more gaseous compositions associated with the cut-crop. For example, the controller 110 may train an artificial neural network (ANN) using the (labelled) reference samples during the calibration process. During operation in a field 104, the controller 110 can then identify, classify and/or quantify the one or more gaseous compositions associated with the cut-crop 102 using the ANN. The controller 110 may implement other multi-variate analysis techniques such as principal component analysis (PCA).

The cut-crop sensor 108 may be positioned at a front of the mobile agricultural machine 106 with respect to a forward direction of operation. The cut-crop sensor 108 may be positioned within a threshold sensing height from a ground surface or a contact point of the machine 106 with the ground surface. The threshold sensing height may comprise 1 meter, preferably 0.5 metres, more preferably 0.3 metres. In some examples, the cut-crop sensor 108 may comprise an input duct for carrying the gaseous composition to an active area of the cut-crop sensor 108. The cut-crop sensor 108 may further comprise active air means for producing an air-flow from a distal end of the input duct to a proximal end of the input duct adjacent to the active area of the sensor 108. In examples comprising an input duct, the threshold sensing height may be with reference to the distal end of the input duct.

In some examples, the mobile agricultural machine 106 may include a cover or housing to protect the cut-crop sensor 108. The sensor cover can protect the cut-crop sensor 108 from heavy dust and/or from precipitation. Protecting the sensor from precipitation can advantageously reduce any interference of the precipitation on moisture detection. Protecting the cut-crop sensor from heavy dust can advantageously reduce saturation of the cut-crop sensor or clogging of an air particulate filter of the cut-crop sensor.

The mobile agricultural machine 106 may comprise an agricultural vehicle and/or agricultural implement. In this example, the mobile agricultural machine 106 comprises an agricultural implement in the form of an agricultural rake 118 towed by an agricultural vehicle in the form of a tractor 116. The mobile agricultural machine 106 may comprise any agricultural vehicle including: a tractor; a forage wagon; a drone; or a scout. The machine 106 may alternatively or additionally comprise: a rake; a mower; a baler; a macerator; or a tillage implement. The mobile agricultural machine 106 may comprise a manually, semi-autonomously or autonomously operated vehicle and/or implement. Although the present embodiment describes the machine 106 estimating the condition of the cut-crop 102 laying in the field 104 (sometime after mowing) it will be appreciated that the machine 106 may comprise a mower and may estimate the condition of the cut-crop during a cutting process. Estimating the condition of the cut-crop during the cutting process can provide an initial value of cut-crop condition, e.g. an initial moisture value, an initial mould value etc.

In this example, unprocessed cut-crop **102*a* is laying dispersed in the field 104. The unprocessed cut-crop 102*a* may have been dispersed by a previous process such as tedding or mowing. The agricultural rake 118 can rearrange or gather the unprocessed cut-crop 102*a* into windrows or swaths of processed cut-crop 102*b*** suitable for collection during a subsequent process such as baling.

As described above, the cut-crop sensor 108 can detect a gaseous composition associated with the unprocessed cut-crop **102*a* and output a corresponding sensing signal 112 to the controller 110. The controller 110 may identify the gaseous composition and estimate the condition of the unprocessed cut-crop 102*a*. The controller 110 may estimate the condition of the cut-crop by comparing a level (or quantity) of an identified gaseous composition to one or more corresponding condition thresholds. For example, the controller 110 may estimate whether the cut-crop 102 comprises mould, or excessive mould, by comparing a level of a gaseous composition associated with mould to a mould condition threshold. The controller 110 may perform similar comparisons for moisture condition thresholds, fermenting condition thresholds, rotting condition thresholds etc. In this example, the controller 110 has estimated a condition of first portions 102*c* of the cut-crop to be sufficiently dry and mould free to be raked into swaths. The controller 110 may estimate the condition of the cut-crop 102 to be sufficiently dry and mould free by measuring a level of a gaseous composition associated with the smell of fresh grass (or moist grass) to be less than a moisture condition threshold and measuring a level of a gaseous composition associated with hay mould to be less than a mould condition threshold. In this example, the controller 110 has estimated a condition of a second portion 102*d* of the cut-crop to not be sufficiently dry for raking based on a level of the gaseous composition associated with the smell of fresh grass exceeding the moisture condition threshold. In this example, the controller 110 has estimated a condition of third portions 102*e* of the cut-crop to comprise mould based on a level of the gaseous composition associated with hay mould exceeding the mould condition threshold. The second 102*d* and/or third portions 102*e*** may comprise low-laying or shaded portions of the field that are more susceptible to moisture retention and mould formation.

In some examples, the condition thresholds may be crop specific, crop purpose specific and/or user-configurable. For example, the condition and quality requirements for straw crop to mix in a total mix ratio system for fuel is not as stringent as for straw crop to use in animal bedding. Therefore, the mould condition threshold may set to be more stringent for the straw crop for animal bedding. As a further example, the condition thresholds may be user-configurable advantageously enabling an operator to customize the condition sensing to specific customers based on customer feedback. For example, a first alfalfa grower may reject bales from a contractor (e.g. for having too much moisture) that a second alfalfa grower would find acceptable.

In some examples, the controller 110 may monitor a change in condition of the cut-crop 102. For example, the controller 110 may determine a difference between a first level of a gaseous composition at a first time and a second level of the gaseous composition at a second time, later than the first time, and determine a corresponding change and/or rate of change of condition of the cut-crop 102. The second time may correspond to a different traverse of the agricultural machine (for example a second tedding operation or a second traverse by a scout vehicle). In this way, the controller 110 may estimate a relative change and/or a rate of change of a dryness condition or mould formation etc. of the cut-crop 102. The controller 110 may output the relative change and/or the rate of change of the condition as part of the cut-crop state data 114. Monitoring the change in condition of the cut-crop 102 can advantageously remove the requirement for a reference odour library.

The mobile agricultural machine 106 may further comprise a position sensor 120. The position sensor 120 may comprise a GPS sensor or any known position sensor. In this example, the position sensor 120 is located on the tractor 116. The position sensor 120 may identify a position of the machine 106 within the field 104. The controller 110 may receive position data from the position sensor 120 and associate position data with a condition of a portion of the cut-crop 102. In other words, the controller 110 may generate the cut-crop state data 114 as an array of condition values with each condition value having associated position data. In this way, the system 100 can map the condition of the cut-crop 102 across the field 104.

In some examples, the controller 110 may selectively enable the cut-crop sensor 108 and/or selectively estimate the condition of the cut-crop 102 based on the position of the agricultural machine 106 identified by the position sensor 120. For example, the controller 110 may periodically or randomly enable the cut-crop sensor 108 and/or estimate the condition of the cut-crop 102, and output the cut-crop state data 114 as sampled condition values with an associated position across the field 104. The controller may increase a sampling rate at predefined portions of the field 104 which may be identified by an operator. For example, the controller 110 may increase a sampling rate in an area of the field 104 prone to high moisture content/poor drainage. The controller 110 may inhibit/disable the cut-crop sensor 108 in areas of the field 104 known to be dusty, such as a field entrance. The controller 110 may also inhibit the cut-crop sensor 108 at edges or borders of the field 104 to avoid interference from adjacent fields. This can reduce interference from dust or odours from adjacent fields and unnecessary use of data storage. The controller 110 may receive field data indicating one or more regions of interest of the field 104 for detection of crop-condition and/or one or more regions for exclusion from the detection of crop-condition. The controller 110 may: selectively enable the cut-crop sensor; selectively estimate the condition of the cut-crop 102; and/or selectively adjust a sampling rate of the cut-crop sensor 108 based on the field data and the position data. The field data may be provided by an operator using a user interface.

In this example, the controller 110 outputs the cut-crop state data 114 to a control system 124 of the tractor 116. The control system 124 may control one or more operating parameters of the mobile agricultural machine 116, i.e. one or more operating parameters of the tractor 116 or rake 118 (in this example). As described below, the control system 124 may control the agricultural machine 106 in response to the cut-crop state data 114.

In this example, the controller 110 also outputs the cut-crop state data 114 to a remote monitoring module 122. The remote monitoring module 122 may be located at a farm premises and/or a network server and may monitor the cut-crop process, e.g., the hay making process. The controller 118 may output the cut-crop state data 114 for display on a display screen of the remote monitoring module 122 e.g., to display a virtual map indicating crop condition across the field 104 or display live values of cut-crop condition. The remote monitoring module 122 may communicate with the controller 110 via known wireless communication means.

In some examples (not illustrated) the controller 110 may be located at the remote monitoring module 122 and may receive the sensing signals from the cut-crop sensor 108 located on the machine 106, via wireless communication means. In some examples, the functionality of the controller 110 may be distributed across one or more processors of the agricultural machine 106 (e.g., a control unit of the tractor 116 and a control unit of the rake 118). In some examples, the functionality of the controller 110 may be distributed between one or more processors on the agricultural machine 106, one or more processors located at the remote monitoring module 122, one or more processors located on other mobile agricultural machines and/or other networked processors.

The controller 110 may output the cut-crop state data 114 to a cab display unit of an agricultural vehicle, such as the tractor 116 or another agricultural vehicle involved with processing the cut-crop 102. The controller 114 may output the cut-crop state data 114 for display on the display unit e.g., condition values and/or a virtual map indicating crop condition across the field 104. Providing the cut-crop state data 114 for display on the cab display unit and/or a display of the remote monitoring module 122 can advantageously enable an operator to make decisions on processing the cut-crop 102 based on the condition and optionally location of the cut-crop 102. For example, displaying the cut-crop state data 114 on the cab display unit can assist the operator of the mobile agricultural machine 106 to operate the mobile agricultural machine 106 more effectively and avoid processing cut-crop 102 that is not ready for processing or spoiled.

In some examples, the controller 110 may determine one or more process parameters for a processing operation on the cut-crop 102, based on the condition of the cut-crop 102. The controller 110 may output the one or more process parameters as part of the cut-crop state data 114, for example to the remote monitoring module 122, a control system of the mobile agricultural machine 106 or a control system of a second mobile agricultural machine.

The processing operation may comprise a current processing operation or a future processing operation. The processing operation may comprise any of: re-arranging the cut-crop 102, conditioning the cut-crop 102; spraying the cut-crop 102; collecting the cut-crop and tilling the cut-crop. Rearranging the cut-crop 102 may comprise raking the cut-crop 102, e.g, into swaths for baling, or tedding the cut-crop 102, e.g, lifting and fluffing the cut-crop and/or inverting the cut-crop to improve drying. Rearranging may comprise rearranging in a horizontal direction and/or a vertical direction (e.g., lifting and turning (inverting) the cut-crop). Rearranging the cut-crop may comprise throwing portions of the cut-crop out of the swath. Conditioning the cut-crop 102 may comprise macerating the cut-crop 102 with a macerator. Spraying the cut-crop 102 may comprise applying one or more additives. The one or more additives may comprise any combination of water/steam, pH correcting additives, bacterial inoculant, enzymes, silage additives etc. Collecting the crop may include baling, collection with a forage wagon or removing bales from the field. Tilling the crop may include ploughing for example, ploughing residue, leaves, haulm topping etc into the soil and/or harrowing the cut-crop, for example with a disc blade.

The one or more process parameters may comprise a selection-parameter for selecting (or not) a particular processing operation. The selection parameter may correspond to selecting a type of processing operation as a future processing operation. In the illustrated example, if the controller 110 determines that a condition of the cut crop 102 in the field 104 is not sufficiently dry for baling (or raking), the controller 110 may determine a selection-parameter for selecting a tedding/inverting operation as a future processing operation. Conversely, if the controller 110 determines that a condition of the cut crop 102 in the field 104 is sufficiently dry for baling (or raking), the controller 110 may determine a selection-parameter for inhibiting a tedding/inverting operation and selecting a baling operation as a future processing operation. In a similar manner, the controller 110 may determine a selection-parameter for selecting or inhibiting a spraying operation for adding a bacterial inoculant to the cut-crop 102 based on a mould condition of the cut-crop 102.

Alternatively, or additionally, the selection-parameter may correspond to selectively enabling a type of processing operation of the mobile agricultural machine 106. In the illustrated example, the controller 110 may determine a selection-parameter for selectively enabling the rake 118 based on the condition (moisture, mould etc.) of the unprocessed cut-crop 102*a* in the vicinity of the cut-crop sensor 108. In this way, the machine 106 selectively operates based on live cut-crop state data 114. In other words, the mobile agricultural machine 106 may selectively process the cut-crop 102 in the field 104 based on the condition of the cut-crop 102 in the cut-crop state data 114. Examples of the mobile agricultural machine selectively processing the cut-crop include:

- Where the mobile agricultural machine 106 comprises a tedder, selectively tedding the cut-crop when a moisture condition of the cut-crop exceeds a moisture condition threshold. In this way, only moist portions of the cut-crop in the field are tedded.
- Where the mobile agricultural machine 106 comprises a tedder, selectively tedding the cut-crop, selectively adjusting a throwing direction, and/or selectively adjusting a tedding intensity when a mould condition of the cut-crop exceeds a mould condition threshold. In this way, mould infected cut-crop can be thrown out of the swath, prior to baling.
- Where the mobile agricultural machine 106 comprises a rake, selectively raking the cut-crop when a moisture condition of the cut-crop is less than a moisture condition threshold. In this way, only dry portions of the cut-crop in the field are raked into swaths.
- Where the mobile agricultural machine 106 comprises a rake, selectively raking the cut-crop when a mould condition of the cut-crop is less than a mould condition threshold. In this way, mould infected cut-crop is not raked into swaths for baling.
- Where the agricultural machine 106 comprises a baler, selectively lifting a pick-up of the baler and optionally stalling the pick-up, or selectively dropping cut-crop out of the baler, when a mould condition of the cut-crop exceeds a mould condition threshold or when a moisture condition of the cut-crop exceeds a moisture condition threshold.
- Where the agricultural machine 106 comprises a baler, selectively terminating the baler operation when a moisture condition of the cut-crop exceeds a moisture condition threshold. For example, a dew at the end of the day may make result in moist swaths and the baler may postpone the baling operation.
- Where the agricultural machine 106 comprises a sprayer, selectively applying an additive to the cut-crop when a condition of the cut-crop exceeds a condition threshold.
- Where the agricultural machine 106 comprises a macerator (e.g. two corrugated steel rolls turning at different speeds to create a shear in the crop layer), selectively macerating the cut-crop when a moisture condition of the cut-crop exceeds a moisture condition threshold.
- Where the agricultural machine 106 comprises a harrow, selectively harrowing the cut-crop when a decomposition condition of the cut-crop is less than a decomposition condition threshold.

The one or more process parameters may comprise a position-parameter for determining a position or positions of the processing operation. For example, the controller 110 may determine a position-parameter based on cut-crop state data 114 comprising condition values and associated position data. The position-parameter can provide for selective enabling a processing operation based on a position of an agricultural machine processing the cut-crop. In the illustrated example, the controller 110 may determine a position-parameter for a future baling operation as position values of the portions 102*b* of cut-crop swaths suitable for baling and specifically excluding the moulded portions 102*e*. As a further example, a mobile agricultural machine 106 in the form of an automated scout vehicle comprising a cut-crop sensor 108 and a position sensor 120 may determine a plurality of values of cut-crop mould condition, each value having an associated position. The controller 110 may determine a position-parameter identifying selected locations of the field 104 for a future additive operation based on whether a mould condition value at a particular position exceeds a mould condition threshold.

The one or more process parameters may comprise a timing-parameter for scheduling a processing operation. For example, the timing parameter may correspond to a time of a future processing operation or a delay to, or advance of, a future processing operation. The controller 110 may determine the timing parameter using a model, e.g. a moisture model for determining an expected drying time or a mould model for determining a mould growth rate. The model may be based on historic data. For example, the controller 110 may implement a regression function to determine the mould content as a function of time and determine a timing parameter for a rake or tedder process accordingly. The model may be weather dependent and, as described below, the controller 110 may receive additional environmental data, such as weather data, and determine the expected drying time, mould growth rate etc, and resulting timing parameter, based on the condition data and the environmental data.

In the illustrated example, the controller 110 may determine a timing-parameter (and a corresponding position-parameter) for processing the second portion 102*d* of cut-crop that was determined to be not sufficiently dry for raking. The timing-parameter may schedule the mobile agricultural machine 106 to rake the second portion 102*d* after a specified delay time to allow the second portion 102*d* further time to dry out. The delay may be short enough that the mobile agricultural machine 106 may return to rake the second portion 102*d* after finishing the remaining unprocessed cut-crop 102*a* in the field. In other examples, the timing parameter may schedule one or more future tedding operations for more frequent inverting, to improve the drying out process.

The one or more process parameters may comprise an intensity-parameter for setting an intensity of a processing operation. For example, the intensity parameter may set a concentration or flow rate of an additive for a spraying operation. As a further example, the intensity parameter may set an intensity of a tedding operation or a macerating operation. In some examples, the intensity-parameter may relate to a speed setting of an agricultural vehicle associated with the processing operation. For example, the intensity of a spraying operation may be adjusted by increasing or decreasing the speed of a tractor towing a sprayer.

It will be appreciated that different process parameters can be combined for the same process operation. For example, a process operation may have a selection-parameter indicating that the process is enabled, a position-parameter indicating positions of the field the process should be carried out, a timing-parameter indicating when the process should occur and an intensity-parameter indicating the intensity of the operation. For example, the mobile agricultural machine 106 may identify portions of the field 104 with a moisture of the cut-crop 102 less than a moisture threshold. The controller 110 may determine a timing parameter, a position parameter and a selection parameter of a tedding operation to selectively re-ted (and re-rake) only the moist portions of the cut-crop 102.

In some examples, the controller 110 may receive additional environmental data, such as weather data, soil moisture data or humidity data. The controller 110 may determine the one or more process parameters based on the cut-crop state data and the environmental data. For example, the controller 110 may adjust a timing parameter of a baling operation, to advance the baling operation if weather data indicates a forecast of precipitation. Alternatively, or in addition, the controller may adjust the condition thresholds based on the environmental data. For example, the controller 110 may reduce the moisture condition threshold if the weather data indicates a forecast of precipitation.

The controller 110 may output the cut-crop state data 114 for controlling the mobile agricultural machine 106 performing a current processing operation and/or for controlling a second mobile agricultural machine for performing a future processing operation. The controller 110 may output the cut-crop state data 114 comprising the one or more process parameters to a control system of the mobile agricultural machine 106 and/or second mobile agricultural machine. The mobile agricultural machine 106 and/or the second mobile agricultural machine may process or selectively process the cut-crop 102 based on the cut-crop state data 114. In some examples, the controller 110 may output the cut-crop state data 114 comprising the one or more process parameters for display on a cab display unit of the mobile agricultural machine 106 or second mobile agricultural machine. For example, the one or more process parameters may be displayed as an instruction or guidance for the operator of the machine, thereby assisting the operator in using the agricultural machine more effectively.

Figure 2:
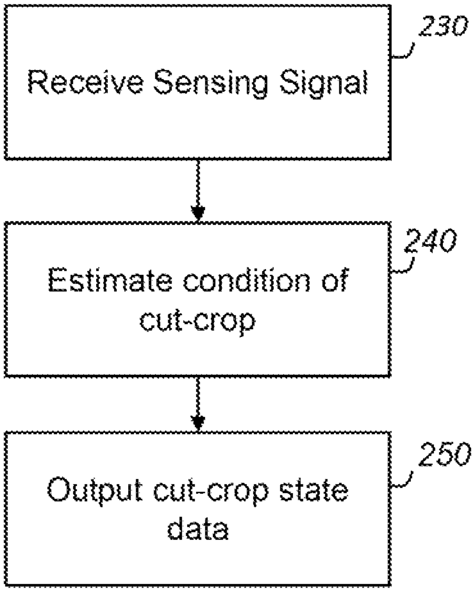
FIG. 2 illustrates a method of monitoring a cut-crop laying in a field or during a cutting process according to an embodiment of the present disclosure.

FIG. 2 illustrates a method of monitoring a cut-crop laying in a field or during a cutting process according to an embodiment of the present disclosure. The method may be performed by the crop monitoring system or controller of FIG. 1.

A first step 230 comprises receiving a sensing signal from a cut-crop sensor positioned on a mobile agricultural machine. The sensing signal is representative of a sensed gaseous composition associated with the cut-crop.

A second step 240 comprises estimating a condition of the cut-crop based on the sensing signal.

A third step 250 comprises outputting cut-crop state data comprising the condition of the cut-crop.

Although the disclosed system and methods have been predominantly described in relation to a hay-making process, it will be appreciated that they may relate to any cut-crop process. The cut-crop may comprise any of: hay, grass, flax, grains, chaff, straw, residue, leaves, stems, stalks, seedpods, husks, tops, shredded crop, mulched crop, or haulm. For example, for a wheat crop, the cut-crop may comprise straw which may be left in swaths by a harvester at the start of the cut-crop process. The residue may comprise chopped straw and chaff. As a further example, for a corn crop, the cut-crop may comprise stalks, husks and/or leaves. As a yet further example, for a root crop (such as potatoes or a beet root), the cut-crop may comprise a haulm topping.

Throughout the present specification, the descriptors relating to relative orientation and position, such as "horizontal", "vertical", "top", "bottom" and "side", are used in the sense of the orientation of the system as presented in the drawings. However, such descriptors are not intended to be in any way limiting to an intended use of the described or claimed invention.

It will be appreciated that any reference to "close to", "before", "shortly before", "after" "shortly after", "higher than", or "lower than", etc, can refer to the parameter in question being less than or greater than a threshold value, or between two threshold values, depending upon the context.

What is claimed is:

1. A method of monitoring a cut-crop laying in a field or during a cutting process, the method comprising:

receiving a sensing signal from a cut-crop sensor positioned on a mobile agricultural machine, wherein the sensing signal is representative of a sensed gaseous composition associated with the cut-crop;

estimating, by a computer controller associated with the mobile agricultural machine, a condition of the cut-crop based on the sensing signal; and outputting, by the computer controller, cut-crop state data comprising the condition of the cut-crop, wherein the condition of the cut-crop is representative of one or more of:

a dryness state of the cut-crop;

a fermenting state of the cut-crop; and a decomposition state of the cut-crop.

2. The method of claim 1, further comprising receiving position data at the computer controller from a position sensor positioned on the mobile agricultural machine, and outputting the cut-crop state data as an array of condition values each associated with a position of the mobile agricultural machine.

3. The method of claim 2, further comprising processing selected locations of the field based on the cut-crop state data.

4. The method of claim 3, wherein processing the field comprises one or more of:

re-arranging the cut-crop;

conditioning the cut-crop;

spraying the cut-crop;

collecting the cut-crop; and tilling the cut-crop into the field.

5. The method of claim 1, wherein the method further comprises:

determining, by the computer controller, one or more process parameters related to one or more processing operations on the cut-crop based on the condition of the cut-crop, wherein the one or more process parameters correspond to any of: a timing parameter, position parameter, a selection parameter, and/or an intensity parameter of the processing operation; and outputting, by the computer controller, the process parameters as part of the cut-crop state data.

6. The method of claim 1, further comprising selectively processing the field based on the cut-crop state data.

7. The method of claim 1, wherein estimating the condition of the cut-crop comprises estimating the condition of the cut-crop by comparing the sensing signal to a reference odour library.

8. The method of claim 1, wherein the cut-crop comprises any of: hay, grass, flax, grains, chaff, straw, residue, leaves, stems, stalks, seedpods, husks, tops, shredded crop, mulched crop, or haulm.

9. The method of claim 1, wherein outputting the cut-crop state data comprises outputting the cut-crop state data to one or more of:

a remote monitoring module;

a cab display unit of an agricultural vehicle; or a control system of the mobile agricultural machine, the control system for controlling one or more operating parameters of the mobile agricultural machine.

10. A cut-crop monitoring system comprising:

a mobile agricultural machine comprising a cut-crop sensor configured to sense a gaseous composition associated with a cut-crop laying in a field or during a cutting process; and a controller configured to:

(i) receive a sensing signal from the cut-crop sensor, wherein the sensing signal is representative of the gaseous composition associated with the cut-crop;

(ii) estimate a condition of the cut-crop based on the sensing signal; and (iii) output cut-crop state data representative of the condition of the cut-crop, wherein the condition of the cut-crop is representative of one or more of:

a dryness state of the cut-crop;

a fermenting state of the cut-crop; and a decomposition state of the cut-crop.

11. The cut-crop monitoring system of claim 10, wherein the controller is further configured to:

estimate the condition of the cut-crop by comparing the sensing signal to a reference odour library.

12. The cut-crop monitoring system of claim 11, wherein:

the cut-crop sensor comprises a sensor array including a plurality of sensor elements;

the sensing signal comprises an element response signal for each sensor element; and the controller is configured to compare a combination of the element response signals to one or more reference signal combinations of the reference odour library.

13. The cut-crop monitoring system of claim 10, wherein the mobile agricultural machine is configured to selectively process the field based on the cut-crop state data.

14. The cut-crop monitoring system of claim 10, wherein the mobile agricultural machine comprises one or more of: a rake; a mower; a macerator; a baler; a tillage implement; a tractor; a forage wagon; a drone; and a scout.

* * * * *